Patented June 16, 1953

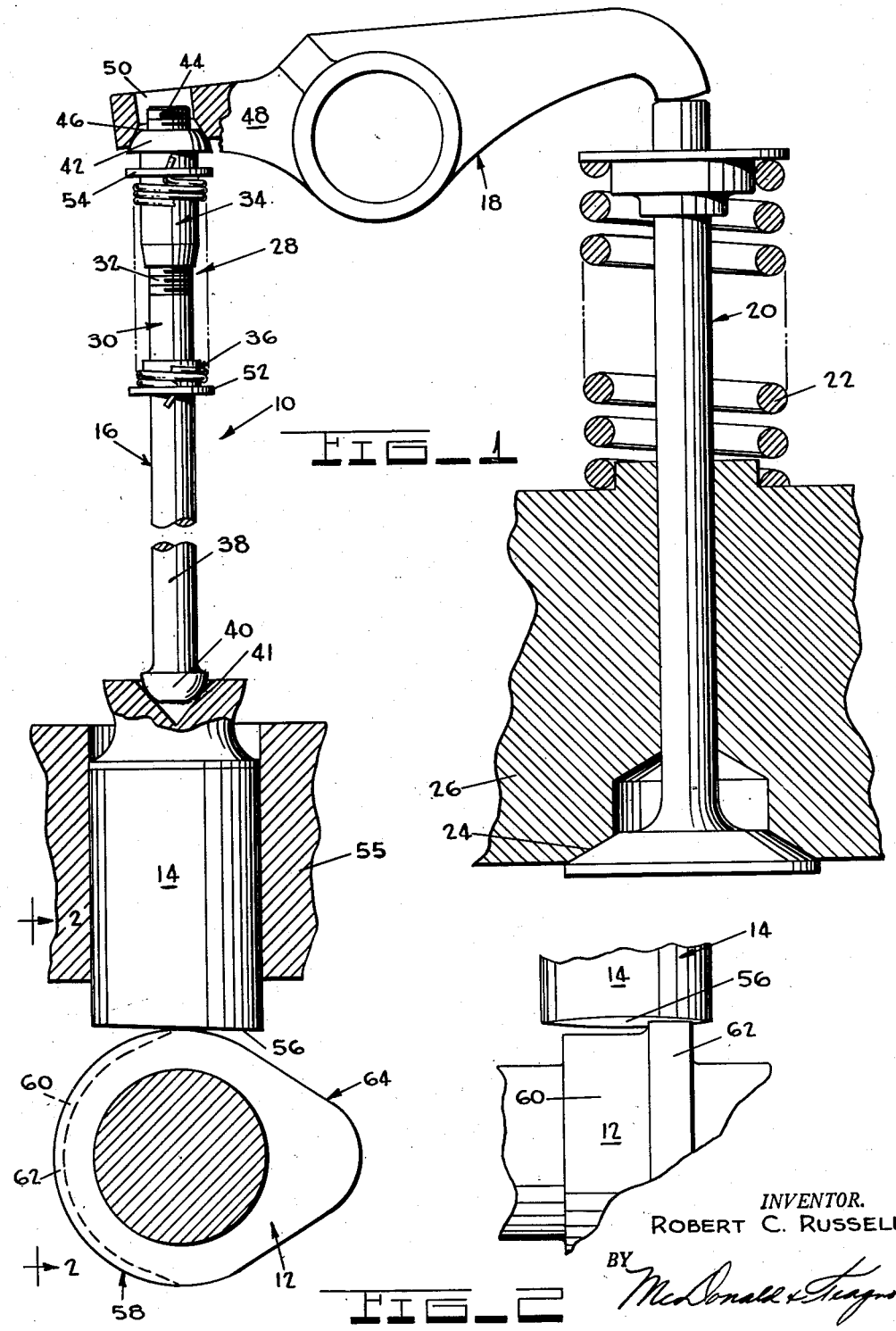

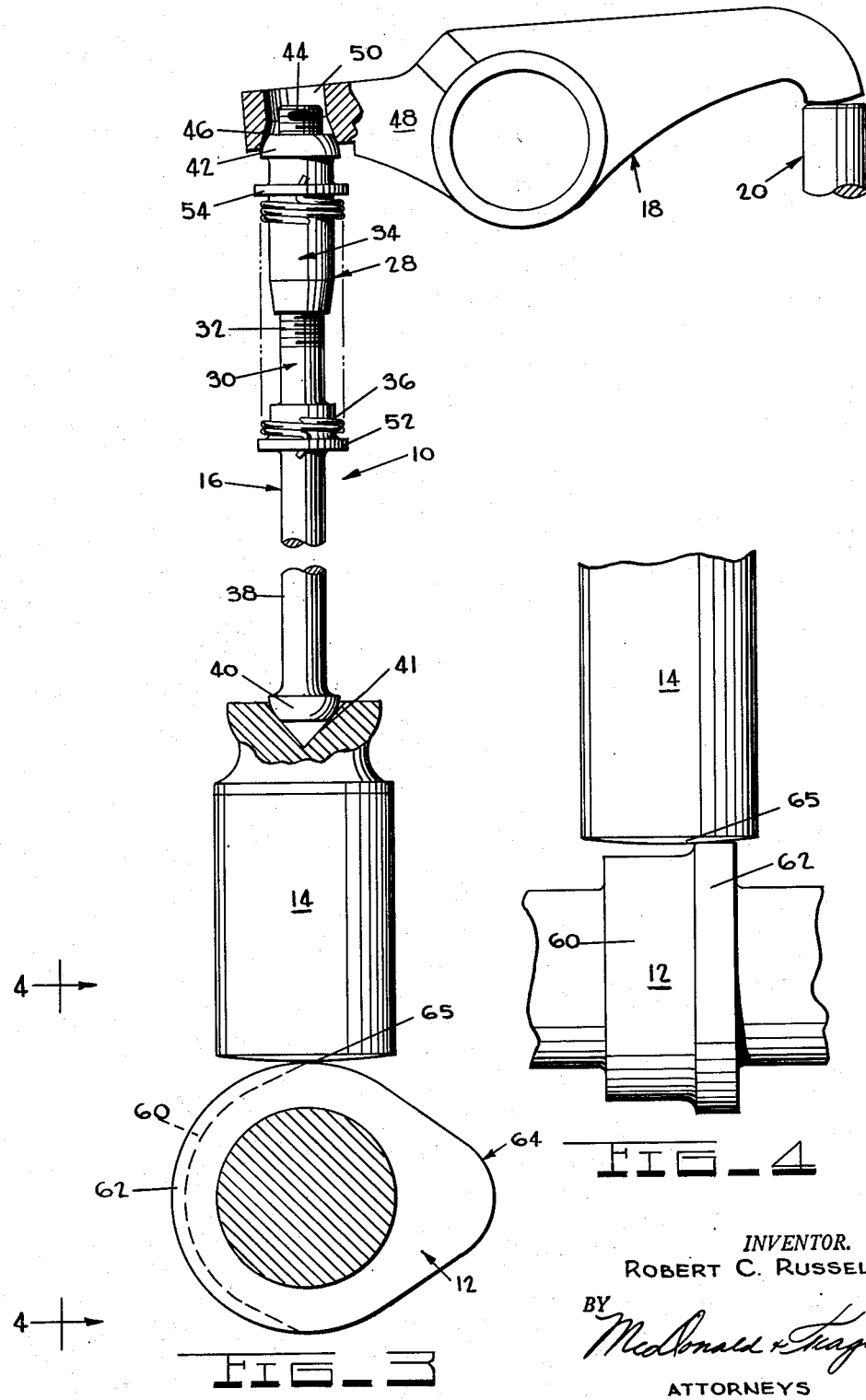

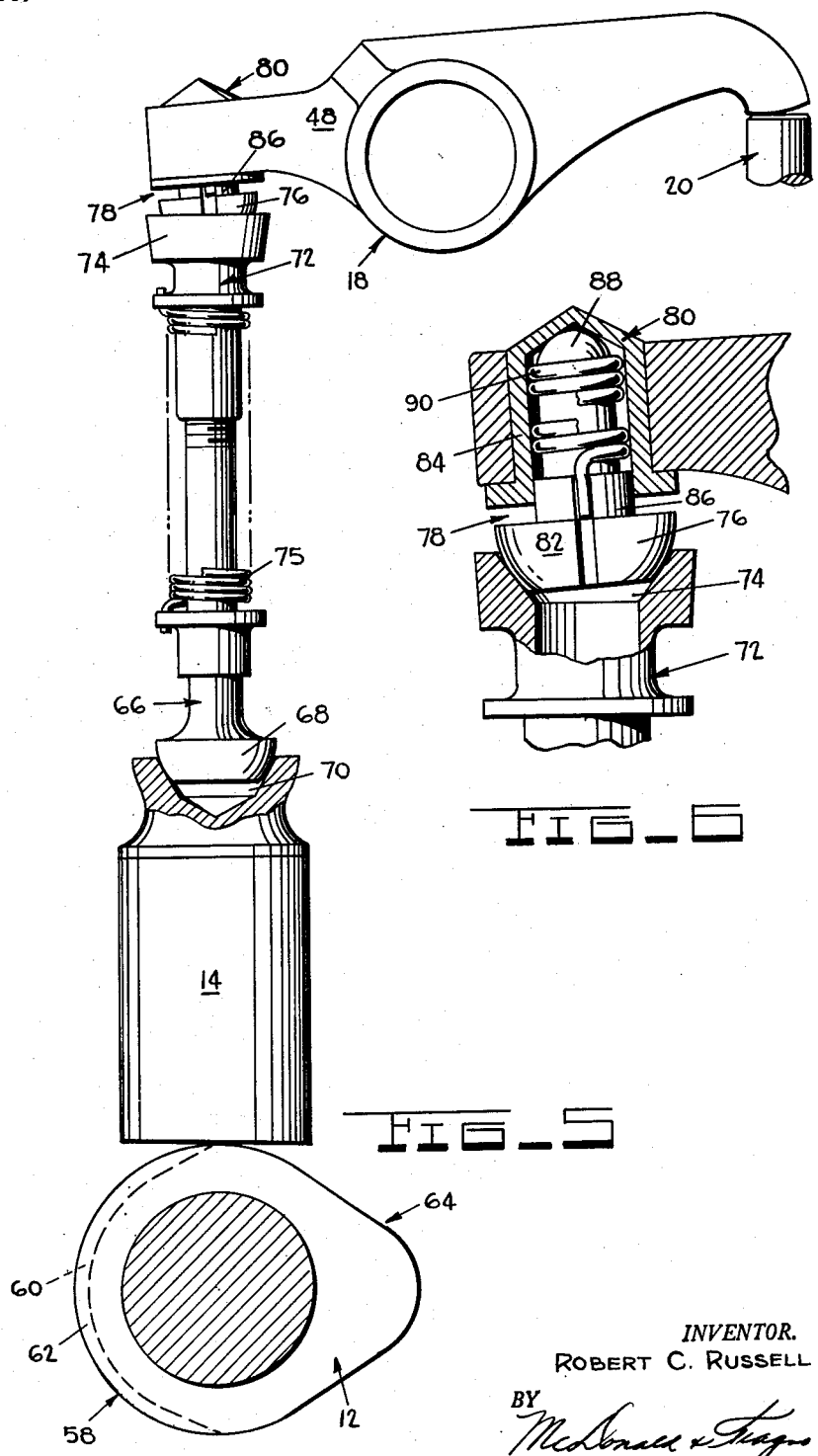

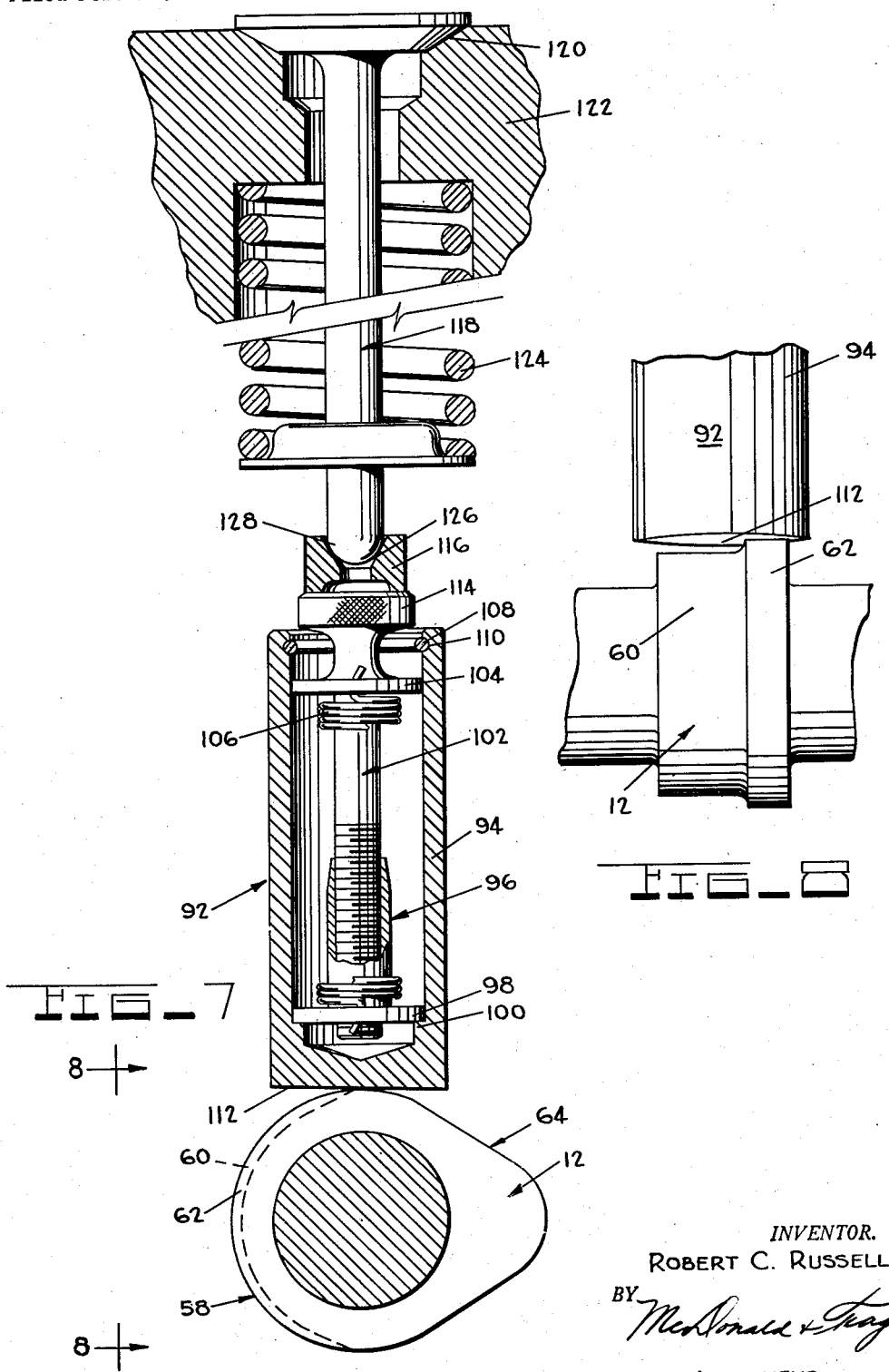

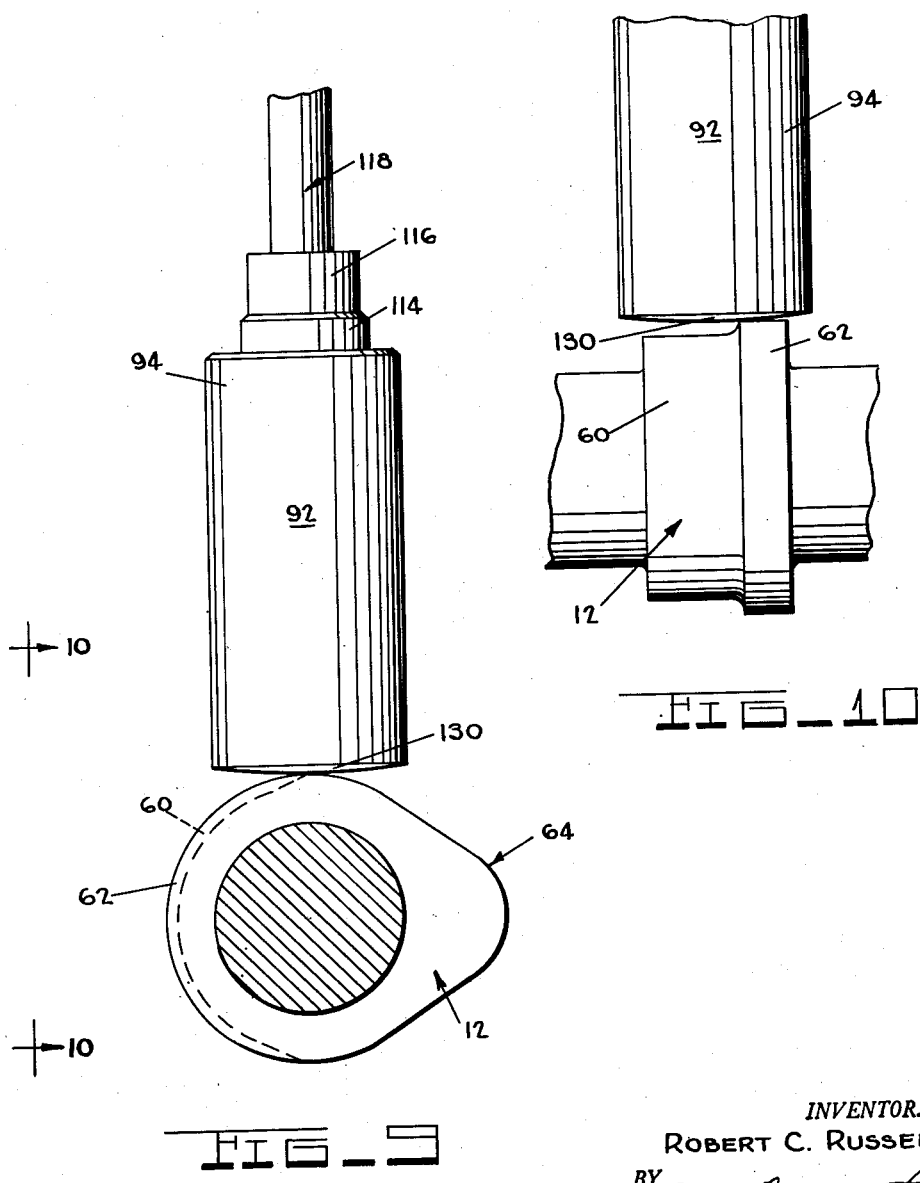

2,642,049

UNITED STATES PATENT OFFICE 2,642,049

VALVE OPERATION COMPENSATING MECHANISM

Robert C. Russell, Euclid, Ohio, assignor to Eaton Manufacturing Company, Cleveland, Ohio, a corporation of Ohio Application February 24, 1951, Serial No. 212,543

8 Claims. (Cl. 123—90)

This invention relates to valve operating mechanism for internal combustion engines and more particularly to means for automatically compensating for variations in length of the operating components of said mechanism.

Broadly the invention comprehends the provision of means in the form of a torsion spring loaded screw and nut assembly incorporated in the component members of a valve operating mechanism and wherein through a prescribed turning of one member of the screw and nut assembly relative to the other member thereof a shortening or elongating compensation for the valve operating mechanism is attained.

Among the several objects of the invention are the following:

To provide mechanical means for automatically compensating for variations in length of the operating components of a valve operating mechanism that is simple and practical of construction, economical to manufacture and effective in operation; that assures an automatic length compensation under all normal conditions of operation such as relates to speed, wear, temperature, contamination, expansion and contraction, etc.; that effects an automatic length compensation upon the base circle portion of the cam of the valve operating mechanism; that only operates to effect a length compensation when required; that compensates for any eccentricities in the base circle portion of the cam; that includes the basic elements of a screw and nut assembly normally biased apart by a torsion spring; that has a turning movement imparted to one of the members of the screw and nut assembly thereof when a length shortening compensation of the valve operating mechanism is required by way of the interengaging friction surfaces of the tappet and cam of said mechanism; that is not subject to excessive wear thus permitting of an extended, service-free life thereof; that insures against overadjustment if the valve should stick open; and that permits of the easy and simple incorporation thereof as a suitable part of any component member employed in the valve operating mechanism such as tappet, pushrod, rocker arm, etc.

Other objects and advantages of the invention will appear from the following description taken in connection with the drawings forming a part of the specification, and in which:

Fig. 1 is a partially elevational, partially cross-sectional view of a valve operating mechanism incorporating automatic length compensation means therein;

Fig. 2 is a fragmentary end view taken substantially along lines 2—2 of Fig. 1;

Fig. 3 is a partially elevational, partially cross-sectional view of a valve operating mechanism incorporating a modified form of tappet from that shown by Fig. 1;

Fig. 4 is a fragmentary end view taken substantially along lines 4—4 of Fig. 3;

Fig. 5 is a partially elevational, partially cross-sectional view of a valve operating mechanism incorporating a modified form of automatic length means from that shown by Fig. 1;

Fig. 6 is a fragmentary enlarged partially cross-sectionalized view of the one-way brake device incorporated in the mechanism of Fig. 5;

Fig. 7 is a partially elevational, partially sectionalized view of a valve operating mechanism incorporating a further modified form of automatic length compensating means from that shown by Fig. 1;

Fig. 8 is a fragmentary end view taken substantially along lines 8—8 of Fig. 7; and Figs. 9 and 10 are fragmentary elevation views of structure differing from Figs. 7 and 8 in that the cam engaging surface of the tappet is of a modified form.

Similar reference characters indicate corresponding parts throughout the several views of the drawings.

This means for automatically mechanically compensating for any expansion, contraction and wear in the operating length of valve operating mechanism for internal combustion engines and the like was devised primarily for the purpose of providing a simple, practical and economical way of overcoming the major shortcomings of previously devised structures for the same purpose.

Referring to the drawings for more specific details of the invention 10 represents generally a valve operating mechanism for an internal combustion engine comprising as component members thereof a cam 12, a tappet 14, a pushrod assembly 16, a rocker arm 18 and a valve 20.

As will be noted in viewing Fig. 1, the valve operating mechanism is shown virtually at rest wherein the cam has just moved to its base circle and the valve has been actuated by valve spring 22 to closed position on its seat 24 in engine block 26.

An automatic length compensating device 28 for the valve operating mechanism is incorporated in pushrod assembly 16, the purpose and operation of which will hereinafter be stated.

The pushrod assembly 16 includes a preferably slender screw element 30 having a screw threaded portion 32 at one end thereof, a nut element 34 threadingly engageable upon the screw threaded portion of element 30 and a torsion spring 36 interconnected between the nut and screw elements normally biasing them apart from one another.

The screw element 30 includes in addition to the screw threaded portion, an opposite axially extended portion 38 terminating at its extremity 40 opposite axially disposed from the threaded portion in a partially spherical shape. The spherical end 40 of the screw element is received in annular line bearing relation in a conical shaped socket 41 formed in one end of tappet 14.

The nut element 34 in being threaded upon the screw element is normally positioned within the axial confines of the screw element such that a part of said threaded portion of the screw element protrudes axially outwardly beyond the outer end 42 of the nut element. A thread obstruction 44 is provided near the extremity of the threaded portion of the screw element serving to inhibit movement of the nut element off of the screw element and thus establishing the maximum extent to which adjustment for lengthening of the pushrod can be made.

A spherical surface is provided upon outer end 42 of the nut adapted to have annular line bearing engagement with a conical socket 46 formed as part of one arm 48 of rocker arm 18. With the threaded portion of screw element 30 extending axially beyond the nut element 34 and with the spherical end 42 of the nut element in bearing relation in socket 46 of the rocker arm, the threaded portion is received in an aperture 50 in the rocker arm concentric with the socket.

The torsion spring 36 is arranged in telescoping relation to the nut and screw elements under load with its opposite extremities secured respectively upon a collar 52 of the screw element and a collar 54 of the nut element tending to bias the screw and nut elements apart from one another. The pre-load of the spring is to be of an amount sufficient to permit of elongation of the pushrod to the extent of adjustment permitted.

The screw and nut elements are threaded righthanded as shown by Fig. 1 and preferably are to be of as steep an angle as possible just so long as they are self-locking. This steep thread angle is used to get a broad differential between the effort required to shorten the screw and the effort required to lengthen the screw. In so being selflocking it is not possible to cause a threading up of the nut and screw elements due to any amount of axial load.

Tappet 14 is supported for reciprocation in the tappet guide 55 and as such is free to oscillate without interference.

An inclined cam engaging surface 56 is provided on one end of the tappet axially oppositely disposed from socket end 41 thereof. The angle of the cam end of the tappet should substantially exceed the maximum anticipated manufacturing misalignment from the customary 90° relation of the axis of the tappet and the cam and thereby insure against oscillation or rotation of the tappet during an opening and closing of the cycle of the valve. This same angle will cause the tappet to caster into line contact with the cam face.

The inclined surface of the tappet is engageable by the cam with the median line of the main contacting surface of the cam preferably arranged in intercepting relation to the axis of the tappet.

The cam is provided across the major portion of its base circle 58 with a relief 60 such as to present a flange 62 offset one side of the median line of the main contacting surface of the cam such that the flange is engageable with the tappet effective to cause turning thereof if a load is existent between the engageable surfaces of the cam and tappet on the base circle. This turning which is imparted by flange 62 to the tappet is readily apparent since the flange contacts the tappet at a given radius arm from the axis of the tappet which exerts a sufficient torque to turn it against the resistance imposed thereon.

In a normal operation of the valve operating mechanism of Fig. 1 assuming that as shown the component valve 20, rocker arm 18, push rod 16, tappet 14, and cam 12 are in perfect engaged relation to one another, that is with zero clearance throughout and with no other load than that of the torque spring, a rotation of the cam in a clockwise direction from the position shown all the way across the base circle of the cam to the beginning of ramp 64 of the cam will not cause the actuation of any other component member of the valve operating mechanism. This non-actuation of the members of the valve operating mechanism aside from the cam is only possible during this phase of operation of the cam if no eccentricity is present in the base circle of the cam. Otherwise if there is eccentricity, any portion of the base circle undersize will be immediately compensated for by the action of pre-loaded torsion spring 36 operating to maintain zero clearance by its act of elongating the pushrod through relative movement of the screw element to the nut element.

On the other hand if the eccentricity is an amount oversize to the base circle a tendency to lifting the valve off its seat would be present thus imposing a load between the tappet and cam surfaces of an amount whereby the flange 62 in engagement upon the tappet surface 56 will cause a turning of the tappet which turning by way of frictional engagement of spherical surface 40 on the pushrod with the surface of socket 41 in the tappet will effect a turning of the screw element into the nut element for a shortening operation of the pushrod. This screwing up of the screw and nut elements or shortening of the pushrod as it may be termed will continue so long as the amount of excess eccentricity requires and until the load acting upon the component members is removed. By so shortening the pushrod which occurs almost instantaneously with the encountering of the plus eccentricity the valve is prevented from being moved off its seat, thus maintaining the required closed condition thereof other than on the desired opening and closing operating cycle thereof.

The friction provided between the end 40 of the screw element of the pushrod and the socket of the tappet need be of an amount sufficient to provide for the coupled turning of the tappet and the screw element in a clockwise direction to overcome the combined turning resistance offered by the threads of the screw and nut elements in a threading together thereof and the pre-load of torsion spring 36 while at the same time permitting of the relative movement of the tappet to the screw element in a counter-clockwise direction against the resistance offered by the threads in attempting to thread them apart when a load is imposed thereon. It is to be understood that this friction provided between the screw element and tappet as relates to the nut and screw elements assembly as above defined is effected by a load imposed on the component members of the valve operating mechanism such as by the valve spring 22.

The friction between the spherical ends 42 of the nut element and the socket 46 of the rocker arm is to be of an amount sufficient to resist the turning resistance between the threads of the screw and nut elements as regards the action of the screw element threading into the nut element for a shortening operation of the pushrod.

The necessity for relative turning movement between the tappet and screw element is obvious because upon the turning of the tappet by the cam to cause a relative turning between the screw and nut elements the correction for misalignment which the tappet's inclined surface makes with the cam has to be restored immediately to line contact so that no undue wear will occur between the cam and tappet surfaces because of misalignment.

The friction engagement had between the spherical end of the nut element and the socket of the rocker arm and between the spherical end of the screw element and the socket of the tappet is purposely made of an annular line bearing nature so as to prevent oil film formation between these surfaces which would ordinarily tend to destroy an established friction relation therebetween especially since the continued maintenance of a substantially predetermined friction is essential to proper operation of the adjusting device and the valve operating mechanism.

As the cam is further rotated, from the point where the base circle merges into the ramp, until where the ramp merges with the base circle on substantially the diametrically opposite side of the cam, an opening or lifting and a closing cycle of operation of the valve occurs. During this cycle of operation with the valve spring 22 offering resistance to movement of the valve a linear load is imposed upon the component members of the valve operating mechanism such that zero clearance engagement is had between the valve and an arm of the rocker arm, the arm 48 of the rocker arm and the nut element, the nut element in turn transmitting its linear motion to the screw element without normal relative movement therebetween, the screw element engaging the tappet and the tappet engaging the cam. With this condition of engagement existing between the members of the valve operating mechanism and with the surface on the ramp of the cam engaging the tappet centrally thereof no turning movement is imparted to the tappet and consequently no false adjustment can take place.

Immediately with the cam returning to its base circle portion the valve spring load is removed from the valve operating mechanism if no expansion has occurred in the length of the mechanism tending to hold the valve off its seat. If expansion has occurred during the previous opening and closing cycle of the valve causing the valve spring load to bear lineally on the component members of the mechanism, a load will be borne between the tappet and cam surfaces such that as the cam flange 62 bears against the tappet surface 56 a turning of the tappet will occur, said turning thereof to be transmitted by way of the friction connection between the tappet and screw element to turn the screw clockwise. Simultaneously with the screw element being turned the nut element by way of its friction connection with the rocker arm is held against turning inasmuch as the resistance to turning thereof is greater than the resistance of the thread and the preload of spring 36 permitting of relative turning between the screw and nut elements, whereby the pushrod is shortened. This shortening will take place only so long as the valve is held open and the valve spring load remains imposed on the valve operating mechanism whereupon with its release and substantially no load being imposed between the tappet and cam, the flange will cease to be able to rotate the tappet and thus will only have surface sliding relation with regards to the cam. With length adjustment having been made to account for expansion in the mechanism the tappet will be turned reversely so that alignment can once again be restored between the cam and tappet. This reverse movement of the tappet is possible without effecting any substantial linear movement being imparted inasmuch as the friction connection between the tappet and screw element is purposely made of an amount to permit of slipping therebetween when a counter-clockwise turning movement is imposed upon the screw element tending to cause a threading apart of the screw and nut element or lengthening of the pushrod. During this stage of operation the resistance to unthreading of the screw and nut elements and also the friction connection between the nut element and rocker arm are each greater than the friction connection between the tappet and screw element.

Should contraction or wear occur in the valve operating mechanism during the opening and closing operation of the valve, the torsion spring 36 will immediately function to compensate therefor as the cam returns to its base circle position in relation to the tappet thus preventing the introduction of clearance in the mechanism by elongating the pushrod through the relative motion of unthreading the screw and nut elements from one another. This movement immediately brings about engagement once again of all the component members of the valve operating mechanism.

Thread obstruction 44 in addition to maintaining the screw and nut elements in coupled assembly prior to installation and use in a valve operating mechanism also insures against over adjustment which might otherwise occur if the valve was caused to be stuck open and thereby prevents any serious damage to the engine block.

Through the use of the inclined surface 56 on tappet 14 an assured alignment is had between the engaging surfaces of the cam and tappet effective to correct for misalignment, wherein the axis of the tappet and camshaft are not arranged substantially perfectly normal to one another. Aside from providing desired alignment between the tappet and cam surfaces the inclination prevents turning of the tappet for all rotation of the cam but when turning of the tappet is required to shorten the pushrod for length adjustment of the valve operating mechanism.

The structures of Figs. 3 and 4 differ from the structures of Figs. 1 and 2 solely in that the tappet 14 is provided with a crown 65 rather than an inclined cam contacting surface. By making the crown of a predetermined arcuate form sufficient alignment can be attained between the engageable surfaces of the cam and tappet such that the cam surface aside from the flange portion 62 thereof will engage the tappet precisely at or near the axis thereof so that rotation will not be imparted to the tappet other than when the flange portion engages the tappet surface under load.

The adjustment operation of the screw and nut elements of the structures of Figs. 3 and 4 will be identical with that of the structures of Figs. 1 and 2 as induced for shortening by the turning of the tappet and for elongation by spring 36 when clearance occurs in the valve operating mechanism.

Although the friction connection of the screw element and the tappet of Fig. 3 is shown identical to Fig. 1, a greater friction connection could be provided without altering the operation thereof inasmuch as there is no need for provision of relative turning between the screw element and tappet inasmuch as the tappet does not have to realign its cam contacting surface with the cam as in the case of the Fig. 1 structure.

Figs. 5 and 6 illustrate a comparative structure to Figs. 1 and 2 with modification primarily in regards to the friction connection between the screw element and the tappet wherein a screw element 66 is provided with a larger spherical end 68, than end 40 of screw element 38 of Fig. 1, adapted for annular line bearing reception in conical walled socket 70 of the tappet. With the provision of the large friction connection between the screw element and tappet, a nut element 72 is provided biased apart from the screw element by a torsion spring 75 and having a conical socket 74 at its one extremity adapted to receive a spherical part 76 of a one way brake mechanism 78. The brake mechanism 78 is incorporated in the rocker arm 18 and includes a cylindrical thimble 80 fixedly pressed in the rocker arm, a pin 82 including a slender cylindrical body portion 84 terminating at one end in an enlarged head 86 having the spherical part 76 integral therewith and at its other end in a spherical form 88 bearing in annular line relation upon a conical base wall of the thimble 80, and a closely wound spring 90 connected to the pin at one end and extending in coiled relation about the body portion 84 thereof adapted to be engageable with the inner circumferential wall of the thimble.

The one way brake operates, upon the tendency for the nut element 72 to be rotated clockwise by the action of the pin through frictional connection with the nut element causing the spring to be expanded into braking engagement against the inner wall of the thimble effective through the frictional connection between the pin and nut element to restrain movement of the nut element and allow a threading up of the screw element. The screw element 66 is free to thread clockwise upon the nut inasmuch as the turning resistance of the threads is less than either the friction connection between the screw element and the tappet and the nut element and the pin 82.

When as in the case of the structure of Fig. 1 the tappet is required to reverse its turning once it has been turned a required amount to shorten the pushrod, the friction connection between the screw element and tappet will permit of their joint movement especially since the one way brake will not offer any counter-clockwise resistance to turning of the pin 82 and also the nut element 72 frictionally connected thereto. Consequently when the tappet of Fig. 5 is required to reverse itself and return to its normal aligned operating position the push rod, pin and spring 90 will turn as a unit therewith without causing any length change in the pushrod.

Figs. 7 and 8 are directed at the provision of an automatic length compensating device as embodied entirely in a tappet 92 and which for all intents and purposes operates precisely the same as the compensating device incorporated in the valve operating mechanism of Fig. 1.

The tappet 92 includes a hollow cylindrical body 94 closed at one end and open at its other end, a nut element 96 having a collar 98 integral therewith seated upon a shoulder 100 provided internally of the body near the closed and thereof, a screw element 102 threadingly associated with the nut element having a collar 104 therein for guiding the element for movement relative to the body internally theerof and a torsion spring 106 interconnected between the screw and nut elements normally biasing them apart. A snap ring 108 is fitted in a groove 110 near the open end of the body adapted to be engageable by the collar 104 of the screw element to limit outward movement thereof from the tappet body.

The tappet body similarly to the tappet 14 of Figs. 1 and 2 has an inclined cam engaging surface 112 adapted for engagement with a like cam to cam 12 of the previously defined structures.

The tappet as shown by Fig. 7 has its cam engaging surface 112 in engagement with cam 12 and through the provision of an enlarged head 114 on the free end of the screw element and an alignment collar 116 is engageable with the foot end of an engine valve 118 seated in seat 120 of the engine block 122 and held thereon by way of valve spring 124.

The collar 116 sits freely upon the top of head 114 of the screw element in annular bearing relation thereto and receives on its opposite side in a conical cavity 126 thereof a spherical surface 128 of valve 118 in annular line bearing relation. Through this collar arrangement a compensation for misalignment between the tappet and valve is had due to the universal movement permitted thereby while at the same time a desired frictional engagement diameter is provided effective to hold the screw against rotation when shortening of the tappet or threading up between the screw and nut elements is demanded.

The resistance offered to turning movement between the collar of the nut element and tappet body is ample so that upon rotative movement being imparted to the tappet body through load engagement of the cam engaging surface of the tappet body and the flange portion 62 of the cam surface, the nut will turn with the tappet and cause a threading up of the nut element upon the screw element. Because of the resistance to turning movement of the collar upon the valve and nut element being of a value greater than resistance to threading up between the screw and nut elements, the nut is held against movement in a clockwise direction but permits of a relative counter-clockwise turning of the screw element 102 relative to the valve either as occasioned by the overcoming of friction between the collar and screw element or collar and valve.

The operation for shortening or elongating the tappet is the same as occurs in the adjustment device of Figs. 1 and 2 wherein the cam in engagement with the tappet occasions a turning of the tappet body when the flange portion of the cam engages the cam engaging surface of the tappet under load to so shorten the tappet and the torsion spring operates to elongate the tappet as demands require.

Figs. 9 and 10 serve solely to illustrate the utilization of the tappet structure of Figs. 7 and 8 wherein the cam engaging surface of the tappet body is provided with a crown 104 instead of the inclined surface 112. As such this structure is comparable in operation to the structure of Figs. 3 and 4 likewise as the structure of Figs. 7 and 8 operates in a like manner to that of Figs. 1 and 2.

In all instances of the structure of Figs. 3 through 10 a like thread relation is had between the screw and nut elements whereby under load a relative threading up of the elements is easily effected whereas an opposite threading apart can only occur when the load is removed therefrom. It is for this reason that the threads are made as steep as possible just so long as they are self-locking.

Although the various structures have been shown and defined in regards to specific structural forms and to particularly specific applications many departures can be made therein without changing the basic fundamentals involved and accordingly the invention is to be limited only as indicated by the appended claims.

What I claim is:

1. A valve operating mechanism comprising threadingly engaged screw and nut members, a spring normally biasing the members apart, a rotatable cam including a ramp portion and a base circle portion, said base circle portion presenting a peripheral flange of narrower width than the remaining contact engaging surface of the cam, and a freely reciprocable and rotatable tappet, reciprocable along an axis substantially at right angles to the axis of rotation of the cam, having a part thereof engageable with one of the threadingly engaged screw and nut members and a cam contacting surface oppositely axially disposed to said part thereof, said flange being engageable with the cam contacting surface of the tappet at a radius to the axis of the tappet and said cam contacting surface lying substantially in a plane angularly disposed a slight amount to a plane perpendicular to the axis of the tappet said angularity being equal to or greater than the angular variation from true right angular relation between the axes of the tappet and cam.

2. A mechanism according to claim 1 wherein a member non-rotatable with respect to the axis of the screw and nut members is provided having frictional engagement with the member of said screw and nut members other than the one having engagement with the tappet.

3. A mechanism according to claim 1 wherein the screw and nut members constitute a pushrod, one member of which has engagement with the tappet axially oppositely disposed from its cam contacting surface and wherein a rocker arm forming a part of the valve operating mechanism is provided including an arm having frictional engagement with the other member of the screw and nut members.

4. A mechanism according to claim 3 wherein a one way brake mechanism is incorporated in one arm of the rocker arm and one of the members has frictional engagement with a part thereof.

5. A mechanism according to claim 3 wherein in a greater frictional resistance to turning is had between the one member and the rocker arm than between the other member and the tappet and wherein the frictional resistance to threading up of the members is less than frictional resistance to turning between the members and the respective rocker arm and tappet and wherein the frictional resistance to turning between the tappet and member engageable therewith is less than the resistance to threading apart of the members when under axial compressive load.

6. A mechanism according to claim 4 wherein the threads of the screw and nut members are of like hand as the brake and a greater frictional resistance to turning is had between the one member and the part of the brake which it frictionally engages and between the other member and its frictional engagement with the tappet than between the threads of the screw and nut members.

7. A valve operating mechanism comprising threadingly engaged screw and nut members, a spring normally biasing the members apart, a rotatable cam including a ramp portion and a base circle portion, said base circle portion presenting a peripheral flange of narrower width than the remaining contact engaging surface of the cam, and a freely reciprocable and rotatable tappet, reciprocable along an axis substantially at right angles to the axis of the rotation of the cam, having a part thereof engageable with one of the threadingly engaged screw and nut members and a cam contacting surface oppositely axially disposed to said part thereof, said flange being engageable with the cam contacting surface of the tappet at a radius to the axis of the tappet and said cam contacting surface lying substantially in a plane angularly disposed a slight amount to a plane perpendicular to the axis of the tappet, said angularity being equal to or greater than the angular variation from true right angular relation between the axes of the tappet and cam, said tappet being provided with a central bore within which the screw and nut members are assembled and having an internal annular ledge adjacent the bore upon which one of the members is frictionally mounted and incorporating means adjacent the bore for limiting relative threading apart of the screw and nut members.

8. A mechanism according to claim 7 wherein the member, not frictionally mounted in the body, includes a circular flange supported in bearing reciprocal relation in the bore of the tappet body and supports in frictional engagement on its free end an annular collar which in turn is adapted to have annular line bearing relation with another element of the valve operating mechanism.

ROBERT C. RUSSELL.

References Cited in the file of this patent

UNITED STATES PATENTS

| Number | Name | Date |
|---|---|---|
| 1,820,891 | Spiller | Aug. 25, 1931 |